United States Patent
Pfeiffer

(10) Patent No.: US 10,637,367 B2
(45) Date of Patent: Apr. 28, 2020

(54) CONVERTER SYSTEM AND METHOD FOR OPERATING A CONVERTER SYSTEM

(71) Applicant: SEW-EURODRIVE GMBH & CO. KG, Bruchsal (DE)

(72) Inventor: Georg Pfeiffer, Ravensburg (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 16/311,950

(22) PCT Filed: Jun. 23, 2017

(86) PCT No.: PCT/EP2017/025178
§ 371 (c)(1),
(2) Date: Dec. 20, 2018

(87) PCT Pub. No.: WO2018/015023
PCT Pub. Date: Jan. 25, 2018

(65) Prior Publication Data
US 2019/0214917 A1     Jul. 11, 2019

(30) Foreign Application Priority Data
Jul. 20, 2016   (DE) ........................ 10 2016 008 658

(51) Int. Cl.
*H02M 5/458*   (2006.01)
*H02M 7/06*    (2006.01)
(Continued)

(52) U.S. Cl.
CPC ........... *H02M 5/4585* (2013.01); *H02M 1/00* (2013.01); *H02M 5/458* (2013.01); *H02M 7/06* (2013.01);
(Continued)

(58) Field of Classification Search
CPC ...... H02P 1/00; H02P 1/04; H02P 1/46; H02P 1/16; H02P 1/163; H02P 1/18; H02P 1/22;
(Continued)

(56) References Cited

U.S. PATENT DOCUMENTS 4,399,395 A * 8/1983 Espelage ............. H02M 5/4505
                                                         318/803
7,026,783 B2   4/2006 Eckardt
(Continued)

FOREIGN PATENT DOCUMENTS

DE    102005042318 A1   11/2006
DE    102011017601 A1   10/2012
(Continued)

OTHER PUBLICATIONS

International Search Report dated Sep. 9, 2017, in International Application No. PCT/EP2017/025178 (English-language translation).

*Primary Examiner* — Antony M Paul
(74) *Attorney, Agent, or Firm* — Hunton Andrews Kurth LLP

(57) ABSTRACT

A converter system and a method for operating a converter system having block-type energy feedback, in particular, includes: a power inverter that feeds energy back to an AC-voltage supply system, i.e. in particular a first power inverter; a DC/DC transformer having a control unit; and an electric motor, which is able to be fed by a second power inverter. The DC-voltage-side terminal of the second power inverter is connected to a first terminal of the DC/DC transformer 102, and a current-acquisition device for acquiring the current conveyed by the DC/DC transformer to the terminal of the regenerative power inverter on the DC-voltage side is connected to a control unit, e.g., such that the current values acquired by the current-acquisition device are
(Continued)

supplied to the control unit. The control unit supplies to the DC/DC transformer control signals such that the voltage supplied by the DC/DC transformer to the regenerative power inverter, the acquired current is able to be controlled, in particular controls, to a setpoint-value characteristic.

20 Claims, 3 Drawing Sheets

(51) Int. Cl.
| | |
|---|---|
| H02M 7/81 | (2006.01) |
| H02P 23/06 | (2016.01) |
| H02M 1/00 | (2006.01) |
| H02M 7/797 | (2006.01) |
| H02P 27/08 | (2006.01) |
| H02M 1/42 | (2007.01) |

(52) U.S. Cl.
CPC ............. *H02M 7/797* (2013.01); *H02M 7/81* (2013.01); *H02P 23/06* (2013.01); *H02P 27/08* (2013.01); *H02M 2001/007* (2013.01); *H02M 2001/4283* (2013.01); *Y02B 70/126* (2013.01)

(58) Field of Classification Search
CPC .... H02P 1/24; H02P 1/26; H02P 1/423; H02P 1/42; H02P 3/00; H02P 3/04; H02P 3/12; H02P 3/14; H02P 3/16; H02P 3/18; H02P 3/22; H02P 3/26; H02P 6/00; H02P 6/002; H02P 6/005; H02P 6/04; H02P 6/08; H02P 6/16; H02P 6/14; H02P 6/24; H02P 6/185; H02P 21/00; H02P 21/0035; H02P 21/0042; H02P 21/0046; H02P 21/06; H02P 21/141; H02P 23/00; H02P 25/00; H02P 27/00; H02P 27/04; H02P 27/06; H02P 23/0081; H02P 27/14
USPC ..... 318/400.01, 400.02, 700, 701, 721, 727, 318/800, 801, 430, 432, 599, 805, 811; 363/40, 44, 95, 120
See application file for complete search history.

(56) References Cited

U.S. PATENT DOCUMENTS

| | | |
|---|---|---|
| 9,577,564 B2 | 2/2017 | Schiffmann et al. |
| 2011/0227522 A1* | 9/2011 | Shinomoto ......... H02M 1/4225 318/400.29 |

FOREIGN PATENT DOCUMENTS

| | | |
|---|---|---|
| DE | 102012002089 A1 | 8/2013 |
| DE | 102015113632 A1 | 3/2016 |
| DE | 102014222475 A1 | 5/2016 |
| EP | 1538736 A2 | 6/2005 |

* cited by examiner

CONVERTER SYSTEM AND METHOD FOR OPERATING A CONVERTER SYSTEM

FIELD OF THE INVENTION

The present invention relates to a converter system and to a method for operating a converter system.

BACKGROUND INFORMATION

Certain motors are able to be operated in a speed-controlled manner in a converter system. However, when the motor is operated in a generator mode, electric power is fed from the motor via the power inverter of the converter system supplying the motor back into the intermediate circuit of the converter system.

A drive system having an energy accumulator is described in German Patent Document No. 10 2012 002 089.

German Patent Document No. 10 2014 222 475 describes a transmission system for the contact-free transmission of energy to a vehicle.

German Patent Document No. 10 2011 017 601 describes a control method for a power inverter.

A power inverter is described in German Patent Document No. 10 2015 113 632.

The difference between two phase voltages of an alternating current system is known as the line voltage. The voltage between the system phase and a neutral conductor is denoted as the phase voltage.

SUMMARY

Example embodiments of the present invention provide a converter system and a method for operating a converter system, in which a dangerously high rise in the intermediate-circuit voltage is to be avoided in that a feedback of energy into an alternating-voltage supply system is to be further refined.

According to an example embodiment of the present invention, a converter system having in particular a block-type energy feedback includes: a regenerative power rectifier, in particular featuring regenerative feedback to an AC-voltage supply system, in particular a regenerative power inverter, i.e. in particular a first power inverter; a DC/DC-transformer including a control unit; and an electric motor able to be supplied by a second power inverter. The terminal of the second power inverter on the DC-voltage side is connected to a first terminal of the DC/DC transformer, and a current-acquisition device for acquiring the current conveyed from the DC/DC transformer to the terminal of the regenerative power inverter on the DC-voltage side is connected to a control unit, in particular such that the current values acquired by the current-acquisition device are conveyed to the control unit. The control unit supplies control signals to the DC/DC transformer such that the voltage supplied by the DC/DC transformer to the regenerative power inverter, the acquired current is able to be regulated, in particular regulates, to a setpoint-value characteristic, such that at the instants of the zero crossing of a respective line voltage and/or at the instants of a respective point of intersection of the phase voltages, the setpoint-value characteristic passes through a zero position in a continuously differentiable manner.

This has the advantage that the current to be fed back is able to be predefined, yet the energy feedback is able to be smoothly ramped down to zero in the region of the zero crossings of the line voltages of the AC-voltage supply system and ramped back up again. Interference currents and an oscillation tendency of the system are reduced due to this smooth reduction of the setpoint value and the renewed increasing of the setpoint value, or in other words, a stable operating behavior is achievable in an uncomplicated manner. In particular, a system-compatible energy feedback is possible using the block-type energy feedback. A sinusoidal energy feedback is therefore able to be saved.

A device for acquiring the phase voltages of the AC-voltage supply system is connected to the control unit, so that the control unit is appropriately configured for determining instants of the zero crossings of the line voltages and for determining the setpoint-value characteristic, the setpoint-value characteristic vanishing at the instants of the zero crossings, and thus in particular reaching the zero value, and/or having a smooth, i.e. in particular a continuously differentiable, configuration in the regions of the zero crossings determined by the control unit, the setpoint-value characteristic in particular vanishing at the instants of the zero crossings, i.e. in particular reaching the zero value, and/or having a smooth, i.e. in particular a continuously differentiable, configuration in the respective temporal regions around the instants of the zero crossings. This offers the advantage that the current is able to be easily controlled. A particularly satisfactory system-compatible behavior is able to be achieved because of the smooth characteristic in the regions.

The setpoint-value characteristic may behave according to an even power of a system-synchronous sine function or according to a polynomial of an even-numbered order in the regions of the zero crossings, especially in the respective temporal regions around the instants of the zero crossings. This has the advantage that a particularly satisfactory, system-compatible behavior is achievable.

The setpoint-value characteristic between the regions may be constant in each case, which offers the advantage that it is possible to predefine a setpoint value for the current to be fed back from the intermediate circuit.

Each region may include precisely a single instant at which a zero crossing of one of the line voltages takes place. This has the advantage that it allows for a smooth reduction of the current that is fed back at each zero crossing of the voltage. An excellent system compatibility during the energy feedback is therefore able to be achieved.

The converter system may include a power rectifier whose terminal on the DC-voltage side is also connected to the terminal of the second power inverter on the DC-voltage side and whose terminal on the AC-voltage side is connected to the AC-voltage supply system. This has the advantage that an existing converter is able to be retrofitted with the block-type energy feedback, i.e. a regenerative power inverter, which is supplied by a DC/DC transformer from the intermediate circuit of the power inverter.

A capacitor may be disposed at the respective DC-voltage-side terminal, in particular for smoothing the voltage. This offers the advantage of allowing for a better closed-loop control, in particular for achieving a more stable control behavior, since the adjusted voltage exhibits fewer fluctuations.

According to an example embodiment of the present invention, in a method for operating a converter system, with the aid of the DC/DC transformer, the current supplied to the power inverter feeding energy back into the AC-voltage supply system is controlled to a setpoint-value characteristic which has a smooth characteristic, and thus in particular a continuously differentiable characteristic, in the respective temporal regions around the zero crossing instants of the line voltages of the AC-voltage supply system.

This offers the advantage that a system-compatible energy feedback is able to be performed. This is because the smooth reduction to zero and the subsequent increase make it possible that no current is fed back in zero crossings.

According to an example embodiment of the present invention, in a method for operating a converter system, with the aid of a DC/DC transformer, the current supplied by a regenerative power rectifier to the AC-voltage supply system, in particular the current supplied to the power inverter feeding energy back to the AC-voltage supply system, is controlled to a setpoint-value characteristic, which passes through a continuously differentiated zero point at each point of intersection of the line voltages, and/or which passes through a respective zero point in a continuously differentiable manner at the instants of the zero crossing of a respective line voltage and/or at the instants of a respective point of intersection of the phase voltages, and/or which has a smooth characteristic, i.e. a continuously differentiable characteristic, in the respective time regions around the instants of the zero crossings of the line voltages of the AC-voltage supply system.

This offers the advantage that a soft energy feedback is able to be implemented despite the block-type operating mode.

The setpoint-value characteristic may have no positive values. This is considered advantageous insofar as no line drain from the AC-voltage supply system occurs on a sustained basis.

The setpoint-value characteristic may have a smooth configuration in the regions of the zero crossings, or in other words, in particular a continuously differentiable configuration, the setpoint-value characteristic in the respective temporal regions around the instants of the zero crossings particularly having a smooth configuration, and thus in particular a continuously differentiable configuration. This is considered advantageous insofar as a high system compatibility is achievable.

The setpoint-value characteristic in the regions of the zero crossings, in particular in the respective temporal regions around the instants of the zero crossings, extends according to an even power of a system-synchronous sine function or according to a polynomial of an even-numbered order. This has the advantage that a system-compatible setpoint characteristic in an uncomplicated manner The setpoint-value characteristic between the regions may exhibit a constant characteristic in each case. This is considered advantageous insofar as a stable control behavior occurs.

Each region my include precisely a single instant at which a zero crossing of one of the line voltages takes place. This has the advantage that a smooth vanishing of the current-setpoint value is achievable.

The temporal extension of the respective region around the respective instant may be smaller than the temporal interval between this respective instant and the temporal instant that is immediately following. This offers the advantage that the constant setpoint value has the largest time component, and the drop in the setpoint value to zero takes up only brief periods of time.

Further features and aspects of example embodiments of the present invention are described in greater detail below with reference to the appended Figures.

DETAILED DESCRIPTION

Figure 1:
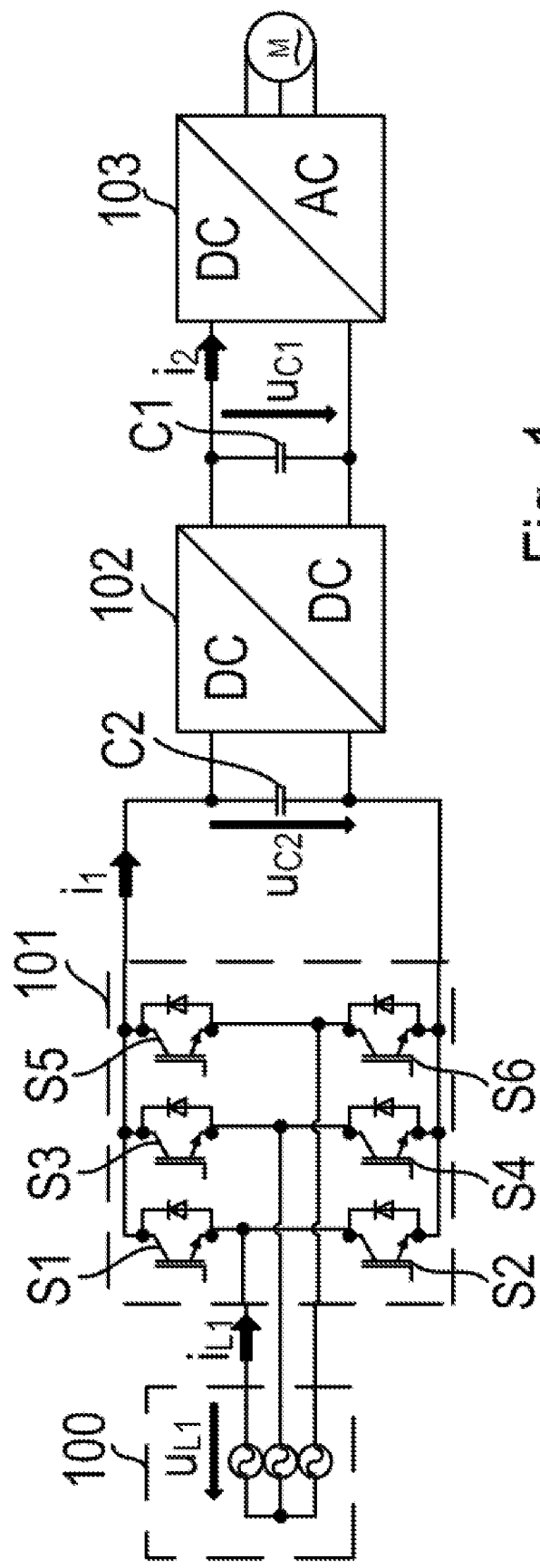
FIG. 1 shows a first converter according to an example embodiment of the present invention, which has a DC/DC transformer 102 disposed in the intermediate circuit.

As illustrated in FIG. 1, a first power inverter 101 is supplied from an AC-voltage supply system 100; its terminal on the DC-voltage side feeds a second terminal of a DC/DC transformer 102 whose first terminal is connected to the DC-voltage-side terminal of a second power inverter 103, whose terminal on the AC-voltage side is connected to an electric motor M arranged as a three-phase motor. As a result, the rotational speed of motor M is controllable during a motor operation of motor M. No voltage conversion by DC/DC transformer 102 takes place in this case.

A capacitance (C1, C2) is disposed at the terminals of DC/DC transformer 102 in each case, so that smoothing of the respectively applied voltage may take place.

In a generator mode of motor M, the power generated in the process is rectified via second power inverter 103 and thus made available at its terminal on the DC-voltage side. Current it conveyed in the direction of first power inverter 101 is adjustable with the aid of the DC/DC transformer.

Toward this end, the three system-side phase voltages (UL1, UL2, UL3) are acquired at the terminal of first power inverter 101 on the AC-voltage side, and instants (t1, t2, . . . , t6) of the zero crossings of the line voltages are determined. On that basis, future instants (t1, t2, . . . , t6) are calculated in advance.

Figure 2:
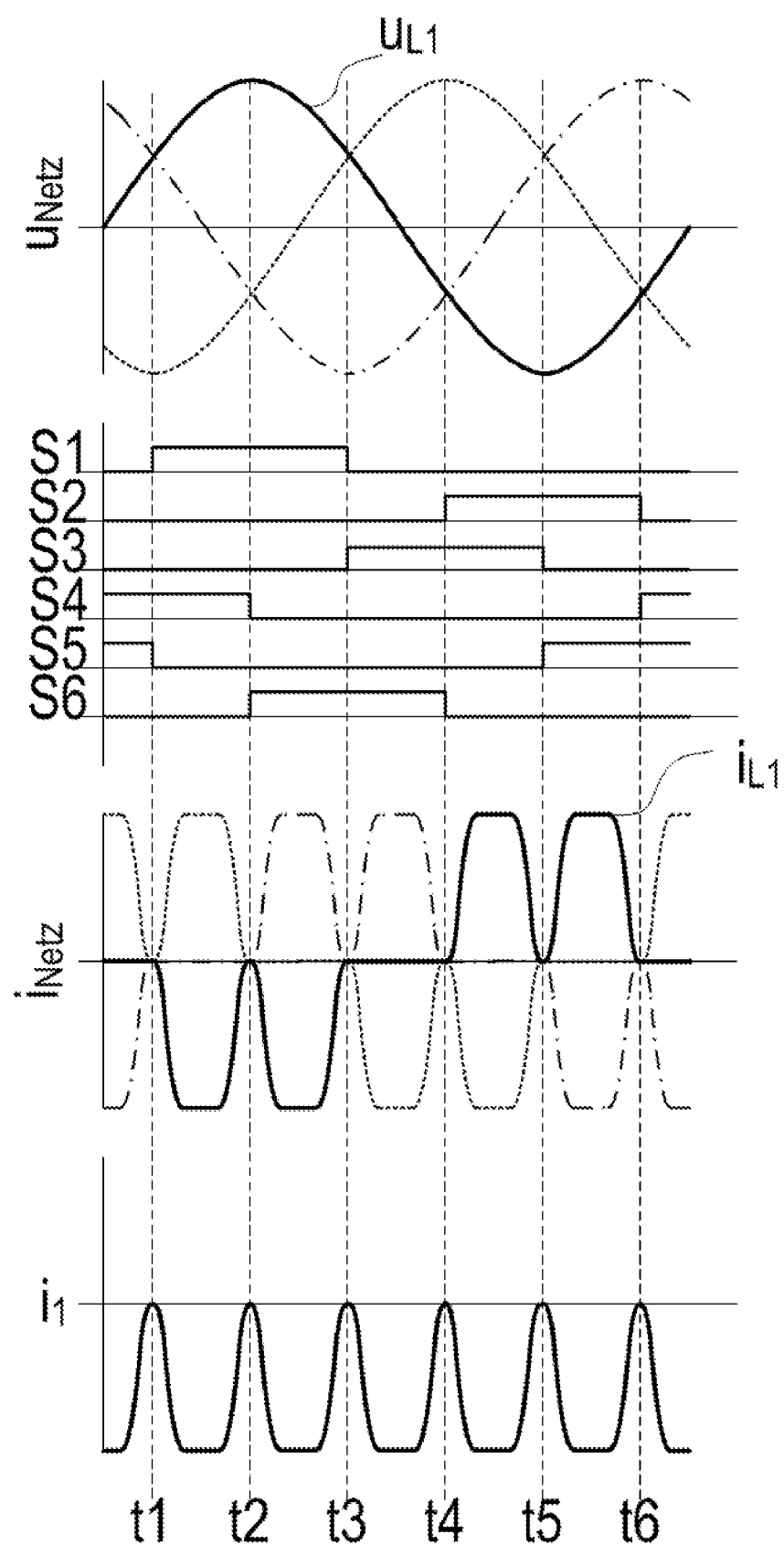
FIG. 2 shows temporal characteristics of currents and voltages.

In order to achieve a system-synchronous block-type energy feedback, the controllable semiconductor switches S1, S2, . . . , S6 are appropriately controlled. As illustrated in FIG. 2, the control signals are controlled in a system-synchronized manner, thereby resulting in phase currents iL1, iL2, iL3.

According to example embodiments of the present invention, a setpoint-value characteristic is predefined for current i1 for DC/DC transformer 102, which is not constant but vanishes at the instants of the determined zero crossings and exhibits a smooth characteristic, i.e. has a continuously differentiable characteristic, in the time ranges around the determined zero crossings.

In other words, the setpoint-value characteristic of current i1 crosses its zero points in a continuously differentiable manner. It should be noted that the setpoint-value characteristic in FIG. 2 is substantially negative because the regenerative case is shown, i.e. the energy feedback. The horizontal line extending in the temporal direction represents the zero value and becomes tangential to the setpoint-value characteristic of current i1 at instants t1, t2, t3, t4, t5 and t6. At these instants, two of the three system-side phase voltages (UL1, UL2, UL3) are identical in each case. Put another way, one of the three line voltages, i.e. the line to line voltages, has a zero crossing at these instants.

In particular, a characteristic that corresponds to an even power of a sine-shaped characteristic is considered to be especially advantageous. In other words, the characteristic in the ranges around the determined zero crossings is used, according to, for example:

$$a+b*(\sin(n*t))^M$$

a, b being constant values in each case, n being proportional to the system frequency, and M being 6, for example. Embodiments featuring M=4 or 8 are also possible. Outside the mentioned regions, i1 is restricted so that a constant value will then be present.

The control of DC/DC transformer 102 has a clock frequency that is much higher than the pulse-width modulation frequency of power inverter 103. A very high characteristic recovery-time constant in comparison with a control with the aid of power inverter 103 is therefore achievable.

Figure 3:
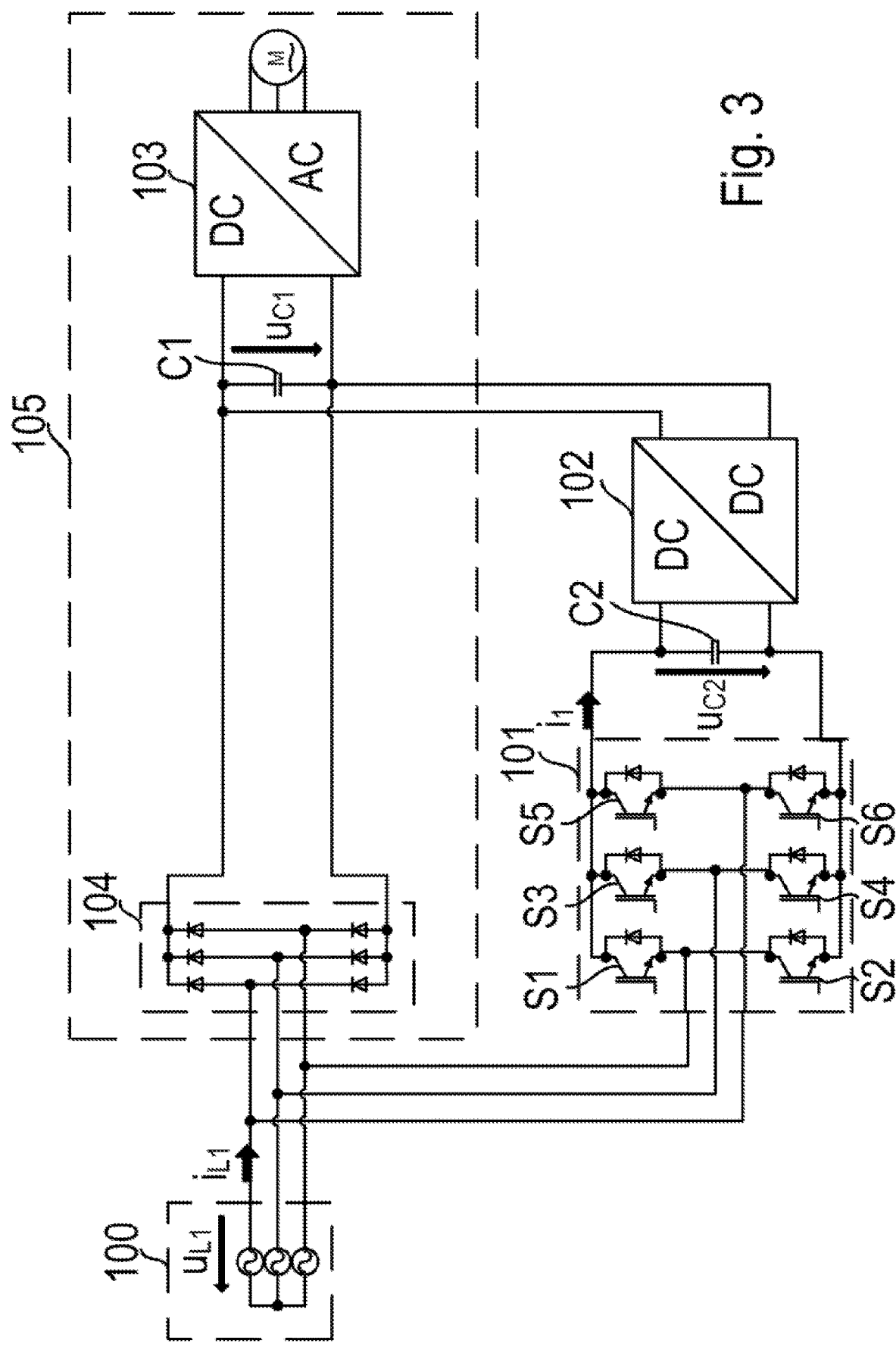
FIG. 3 illustrates an energy-feedback unit according to an example embodiment of the present invention connected to a converter.

As illustrated in FIG. 3, the energy feedback is alternatively able to be added to a converter 105. For instance, a converter 105 is able to be retrofitted with an energy feedback system.

The converter has a power rectifier 104, which is able to be supplied from AC-voltage supply system 100. The output of power rectifier 104 on the DC-voltage side feeds a capacitor C1 for smoothing the voltage, in particular the intermediate-circuit voltage, and the input of power inverter 103 on the DC-voltage side is connected to the output of power rectifier 104 on the DC-voltage side. Electric motor M arranged as a three-phase motor once again is able to be supplied by power inverter 103. As a result, the rotational speed of motor M is controllable with the aid of converter 105.

In addition, the first terminal, in particular the DC/DC-voltage-side terminal, of DC/DC transformer 102 is connected to the terminal of power rectifier 104 on the DC-voltage side and/or of power inverter 103. The second terminal of DC/DC transformer 102 is connected to the terminal of power inverter 101 on the DC-voltage side, whose controllable semiconductor switches, which are once again arranged in half bridges, are controlled in a system-synchronous manner in the previously described manner.

In a generator mode, electric power flows from motor M via power inverter 103 back into the intermediate circuit. From there, the regenerative first power inverter 101 is supplied via DC/DC transformer 102, the former controlling the power flow as a block-type energy feedback in a system-synchronous manner.

In order to control the DC/DC transformer, DC-voltage-side current i1 of first power inverter 101 is acquired and controlled to a setpoint value by an appropriate setting of output voltage UC2. A capacitor C2 is situated at the second output of DC/DC transformer 102 for the smoothing.

Power inverter 101 may be arranged as a regenerative power rectifier so that block-type control voltages are sufficient and no higher-frequency, pulse-width-modulated control voltages are required.

A polynomial of degree 6 or degree 8 may be used instead of an even-numbered power of the sine.

LIST OF REFERENCE CHARACTERS

100 AC-voltage supply system
101 first power inverter
102 DC/DC transformer
103 second power inverter
104 power rectifier
105 converter
UL1 first phase voltage of the AC-voltage supply system
UL2 second phase voltage of the AC-voltage supply system
UL3 third phase voltage of the AC-voltage supply system
iL1 first line-current phase
iL2 second line-current phase
iL3 third line-current phase
S1 controllable semiconductor switch
S2 controllable semiconductor switch
S3 controllable semiconductor switch
S4 controllable semiconductor switch
S5 controllable semiconductor switch
S6 controllable semiconductor switch
S7 controllable semiconductor switch
I1 output current at the DC-voltage-side terminal of the first power inverter 101
UC2 output voltage at the DC-voltage-side terminal of first power inverter 101
C1 first capacitance
C2 second capacitance
M electric motor
I2 output current at the DC-voltage-side terminal of the second power inverter 101
UC1 output voltage at the DC-voltage-side terminal of the second power inverter 101
t1 instant for the zero crossing
t2 instant for the zero crossing
t3 instant for the zero crossing
t4 instant for the zero crossing
t5 instant for the zero crossing
t6 instant for the zero crossing

The invention claimed is:

1. A method for operating a converter system, comprising: controlling, with the aid of a DC/DC transformer, current supplied by a regenerative power rectifier to an AC-voltage supply system and/or current supplied to a power inverter feeding energy back to the AC-voltage supply system to a setpoint-value characteristic that (a) crosses a continuously differentiated zero point at each point of intersection of line voltages, (b) passes through a respective zero point at instants of zero crossing of a respective line voltage and/or at respective instants of a point of intersection of the line voltages in a continuously differentiable manner, and (c) has a smooth configuration and/or a continuously differentiable configuration in respective temporal ranges around the instants of the zero crossings of the line voltages of the AC-voltage supply system.

2. The method according to claim 1, wherein the setpoint-value characteristic has no positive values.

3. The method according to claim 1, wherein the setpoint-value characteristic in the regions of the zero crossings has a smooth configuration and/or a continuously differentiable configuration.

4. The method according to claim 1, wherein the setpoint-value characteristic in the respective temporal regions around the instants of the zero crossings has a smooth configuration and/or a continuously differentiable configuration.

5. The method according to claim 1, wherein the setpoint-value characteristic in the ranges of the zero crossings and/or in the respective temporal regions around the instants of the zero crossing, extends according to an even power of a system-synchronous sine function and/or according to a polynomial of an even order.

6. The method according to claim 1, wherein the setpoint-value characteristic has a constant characteristic between the regions.

7. The method according to claim 1, wherein each region includes precisely a single instant at which a zero crossing of one of the line voltages occurs.

8. The method according to claim 1, wherein a temporal extension of the respective regions around the respective instant is smaller than the temporal interval between this respective instant and the instant that temporally directly follows.

9. The method according to claim 1, wherein the converter system includes:

the regenerative power rectifier adapted to feed energy back to the AC-voltage supply system;

the DC/DC transformer including a control unit;

an electric motor adapted to be supplied by a second power inverter, a DC-voltage-side terminal of the second power inverter being connected to a first terminal of the DC/DC transformer; and a current-acquisition device adapted to acquire current conveyed by the DC/DC transformer to a terminal of the regenerative power inverter on a DC-voltage side connected to a control unit, so that current values acquired by the current-acquisition device are suppliable to the control unit;

wherein the control unit is adapted to convey control signals to the DC/DC transformer such that voltage supplied by the DC-DC transformer to the regenerative power inverter, and an acquired current is controllable to the setpoint-value characteristic so that at instants of zero crossing of a respective line voltage and/or at instants of a respective point of intersection of phase voltages, the setpoint-value characteristic crosses a zero point in a continuously differentiable manner.

10. A converter system, comprising:

a regenerative power rectifier adapted to feed energy back to an AC-voltage supply system;

a DC/DC transformer including a control unit;

an electric motor adapted to be supplied by a second power inverter, a DC-voltage-side terminal of the second power inverter being connected to a first terminal of the DC/DC transformer; and a current-acquisition device adapted to acquire current conveyed by the DC/DC transformer to a terminal of the regenerative power inverter on a DC-voltage side connected to a control unit, so that current values acquired by the current-acquisition device are suppliable to the control unit;

wherein the control unit is adapted to convey control signals to the DC/DC transformer such that voltage supplied by the DC-DC transformer to the regenerative power inverter, and an acquired current is controllable to a setpoint-value characteristic so that at instants of zero crossing of a respective line voltage and/or at instants of a respective point of intersection of phase voltages, the setpoint-value characteristic crosses a zero point in a continuously differentiable manner.

11. The converter system according to claim 10, wherein the converter system is adapted for block-type energy feedback.

12. The converter system according to claim 10, wherein the regenerative power rectifier includes a regenerative power inverter.

13. The converter system according to claim 10, wherein a device adapted to acquire phase voltages of the AC-voltage supply system are connected to the control unit, the control unit adapted to determine zero-crossing instants of the line voltages and to determine the setpoint-value characteristic, the setpoint-value characteristic vanishing and/or reaching a zero value at the zero-crossing instants, having a smooth configuration in regions of the zero crossings determined by the control unit, and/or having a continuously differentiable configuration.

14. The converter system according to claim 10, wherein the setpoint-value characteristic vanishes and/or has a zero value at the zero-crossing instants, has a smooth configuration in respective temporal regions around the zero-crossing instants and/or has a continuously differentiable configuration.

15. The converter system according to claim 10, wherein the setpoint-value characteristic in the regions of the zero crossings and/or in the temporal regions around the instants of the zero crossings has a configuration according to an even power of a system-synchronous sine function and/or according to a polynomial of an even order.

16. The converter system according to claim 10, wherein the setpoint-value characteristic between the regions has a constant characteristic.

17. The converter system according to claim 10, wherein each region encompasses precisely a single instant at which a zero crossing of one of the line voltages takes place.

18. The converter system according to claim 10, further comprising a power rectifier having a terminal on an DC-voltage side connected to the terminal of the second power inverter on the DC-voltage side and a terminal on an AC-voltage side connected to the AC-voltage supply system.

19. The converter system according to claim 10, further comprising a capacitor arranged at a respective terminal on the DC-voltage side adapted to smooth the voltage.

20. The converter system according to claim 10, wherein the converter system is adapted to perform a method that includes controlling, with the aid of the DC/DC transformer, current supplied by the regenerative power rectifier to the AC-voltage supply system and/or current supplied to a power inverter feeding energy back to the AC-voltage supply system to the setpoint-value characteristic that (a) crosses a continuously differentiated zero point at each point of intersection of line voltages, (b) passes through a respective zero point at instants of zero crossing of a respective line voltage and/or at respective instants of a point of intersection of the line voltages in a continuously differentiable manner, and (c) has a smooth configuration and/or a continuously differentiable configuration in respective temporal ranges around the instants of the zero crossings of the line voltages of the AC-voltage supply system.

* * * * *